US009654763B2

United States Patent
Huang et al.

(10) Patent No.: US 9,654,763 B2
(45) Date of Patent: May 16, 2017

(54) CONTROLLING METHOD OF DETECTING IMAGE-CAPTURING GESTURE

(71) Applicant: HTC Corporation, Taoyuan County (TW)

(72) Inventors: Chun-Hsiang Huang, Taoyuan County (TW); Yu-Ting Lee, Taoyuan County (TW); Liang-Kang Huang, Taoyuan County (TW); Tzu-Hao Kuo, Taoyuan County (TW); Edward Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 285 days.

(21) Appl. No.: 14/242,886

(22) Filed: Apr. 2, 2014

(65) Prior Publication Data

US 2014/0293012 A1    Oct. 2, 2014

Related U.S. Application Data (60) Provisional application No. 61/807,341, filed on Apr. 2, 2013.

(51) Int. Cl.
*H04N 13/00* (2006.01)
*H04N 13/02* (2006.01)

(52) U.S. Cl.
CPC ..... *H04N 13/0239* (2013.01); *H04N 13/0264* (2013.01); *H04N 2013/0081* (2013.01)

(58) Field of Classification Search
CPC ......... G06T 7/0071; G06T 2207/20016; G06T 2207/10016; H04N 13/02; H04N 13/0022; H04N 2013/0081
See application file for complete search history.

(56) References Cited

U.S. PATENT DOCUMENTS

| 5,444,791 A | * | 8/1995 | Kamada | G06K 9/00335 |
| | | | | 348/155 |
| 5,594,469 A | * | 1/1997 | Freeman | G05B 19/106 |
| | | | | 345/157 |

(Continued)

FOREIGN PATENT DOCUMENTS

| TW | 201015203 A | 4/2010 |
| TW | 201310970 A | 3/2013 |

OTHER PUBLICATIONS

Bastian et al "Interactive Modelling for AR Applications" IEEE International Symposium on Mixed and Augmented Reality 2010,Science and Technology Proceedings Oct. 13-16, Seoul, Korea.*

(Continued)

*Primary Examiner* — Frank Huang
(74) *Attorney, Agent, or Firm* — CKC & Partners Co., Ltd.

(57) ABSTRACT

A controlling method suitable for an electronic apparatus is disclosed herein. The electronic apparatus includes a first image-capturing unit and a second image-capturing unit. The controlling method includes steps of: obtaining a plurality of second images by the second image-capturing unit when the first image-capturing unit is operated to capture a plurality of first images for a stereo process; detecting an object in the second images; calculating a relative displacement of the object in the second images; and, determining whether the first images are captured by an inappropriate gesture according to the relative displacement calculated from the second images.

15 Claims, 5 Drawing Sheets

(56) References Cited

U.S. PATENT DOCUMENTS

| | | | | |
|---|---|---|---|---|
| 5,617,312 A * | 4/1997 | Iura | G06F 3/011 | 345/157 |
| 5,808,678 A * | 9/1998 | Sakaegi | H04N 5/23293 | 348/333.03 |
| 5,991,428 A * | 11/1999 | Taniguchi | G06K 9/3241 | 348/155 |
| 6,191,773 B1 * | 2/2001 | Maruno | G06F 3/017 | 345/156 |
| 6,498,628 B2 * | 12/2002 | Iwamura | G08C 23/00 | 345/157 |
| 6,501,515 B1 * | 12/2002 | Iwamura | G08C 23/00 | 345/157 |
| 7,639,233 B2 * | 12/2009 | Marks | G06F 3/0304 | 345/156 |
| 7,828,659 B2 * | 11/2010 | Wada | A63F 13/00 | 345/156 |
| 8,035,624 B2 * | 10/2011 | Bell | G06F 3/011 | 345/175 |
| 8,115,877 B2 * | 2/2012 | Blatchley | G06F 1/1601 | 345/158 |
| 8,144,121 B2 * | 3/2012 | Kitaura | G06F 3/0304 | 178/18.01 |
| 8,199,108 B2 * | 6/2012 | Bell | G06F 3/011 | 345/156 |
| 8,203,601 B2 * | 6/2012 | Kida | G06F 3/017 | 348/135 |
| 8,228,305 B2 * | 7/2012 | Pryor | G06F 3/011 | 178/18.01 |
| 8,230,367 B2 * | 7/2012 | Bell | G06F 3/011 | 382/154 |
| 8,253,746 B2 * | 8/2012 | Geisner | G06F 3/011 | 345/474 |
| 8,300,042 B2 * | 10/2012 | Bell | G06F 3/011 | 345/156 |
| 8,340,432 B2 * | 12/2012 | Mathe | G06K 9/00201 | 382/190 |
| 8,368,819 B2 * | 2/2013 | Lee | H04N 21/42204 | 348/734 |
| 8,379,101 B2 * | 2/2013 | Mathe | G06K 9/00342 | 348/222.1 |
| 8,418,085 B2 * | 4/2013 | Snook | G06K 9/00342 | 715/707 |
| 2005/0036067 A1 | 2/2005 | Ryal | | |
| 2007/0279485 A1 * | 12/2007 | Ohba | G06F 3/012 | 348/41 |
| 2008/0088588 A1 * | 4/2008 | Kitaura | G06F 3/0304 | 345/158 |
| 2013/0050427 A1 * | 2/2013 | Chou | H04N 13/0022 | 348/46 |

OTHER PUBLICATIONS

Corresponding Taiwanese Office Action that these art references were cited.

* cited by examiner

CONTROLLING METHOD OF DETECTING IMAGE-CAPTURING GESTURE

CROSS-REFERENCE TO RELATED APPLICATION

This application claims the priority benefit of U.S. Provisional Application Ser. No. 61/807,341, filed Apr. 2, 2013, the full disclosures of which are incorporated herein by reference

BACKGROUND

Field of Invention

The present application relates to a controlling method for an image capturing apparatus. More particularly, the present application relates to a controlling method for preventing user from adopting an inappropriate gesture while capturing images.

Description of Related Art

Stereoscopic image is based on the principle of human vision with two eyes. One conventional way to establish a stereoscopic image is utilizing two cameras separated by a certain gap to capture two images, which correspond to the same object(s) in a scene from slightly different positions/angles. The X-dimensional information and the Y-dimensional information of the objects in the scene can be obtained from one image. For the Z-dimensional information, these two images are transferred to a processor which calculates the Z-dimensional information (i.e., depth information) of the objects to the scene. The depth information is important and necessary for applications such as the three-dimensional (3D) vision, the object recognition, the image processing, the image motion detection, etc.

The digital images captured by one image capture device (e.g., camera) are two-dimensional on one visional angle. In order to obtain the depth information, two images taken from slightly different positions/angles are needed. As mentioned above, two images can be captured by two cameras (multi-views system) separated by a certain gap in a conventional solution. However, this solution involving one extra camera for obtaining the depth information brings extra costs and extra weight.

On the other hand, users can simulate multi-views system by taking serial shots with one single camera. Two (or more) images are sequentially captured while user moving the camera horizontally. These captured images are processed for calculating the depth information. To optimize the effect of stereo-processing, users are preferred to hold the camera with a correct photo-taking gesture. More specifically, users are preferred to rotate the camera along a circular trajectory whose center of circle locates at the user. Unfortunately, users might simply rotate the camera on their palms without moving the camera horizontally. In this case, the camera is simply rotated at a fixed spot without the displacement, and it will lead to imprecise disparity information for following depth computation.

SUMMARY

An aspect of the present disclosure is to provide a controlling method, which is suitable for an electronic apparatus comprising a first image-capturing unit and a second image-capturing unit. The controlling method includes steps of: obtaining a plurality of second images by the second image-capturing unit when the first image-capturing unit is operated to capture a plurality of first images for a stereo process; detecting an object in the second images; calculating a relative displacement of the object in the second images; and, determining whether the first images are captured by an inappropriate gesture according to the relative displacement calculated from the second images.

Another aspect of the present disclosure is to provide an electronic apparatus includes a casing, a first image capturing unit, a second image capturing unit and a control module. The first image capturing unit is disposed on a first side of the casing. The second image capturing unit is disposed on a second side of the casing opposite to the first side. The control module is coupled with the first image capturing unit and the second image capturing unit. The second image-capturing unit is enabled by the control module to capture a plurality of second images when the first image-capturing unit is operated to capture a plurality of first images for a stereo process. The second images are utilized to determining whether the first images are captured by an inappropriate gesture.

BRIEF DESCRIPTION OF THE DRAWINGS

The disclosure can be more fully understood by reading the following detailed description of the embodiments, with reference made to the accompanying drawings as follows.

DETAILED DESCRIPTION

In order to obtain depth information of objects, at least two images taken from slightly different positions/angles are needed. A displacement of a near object between two images will be larger than a displacement of a far object between two images, such that a stereo algorithm can establish the depth information according to the difference between the displacements.

Users can stand at the same spot and sequentially capture two images by moving the electronic apparatus for capturing the images for depth recovery. In order to reduce the difficulty of depth estimation, the electronic apparatus for capturing the images should be hold and move in a proper gesture. In some embodiments, this disclosure provides a controlling method for prompting user to move the electronic apparatus in the proper gesture.

Figure 1:
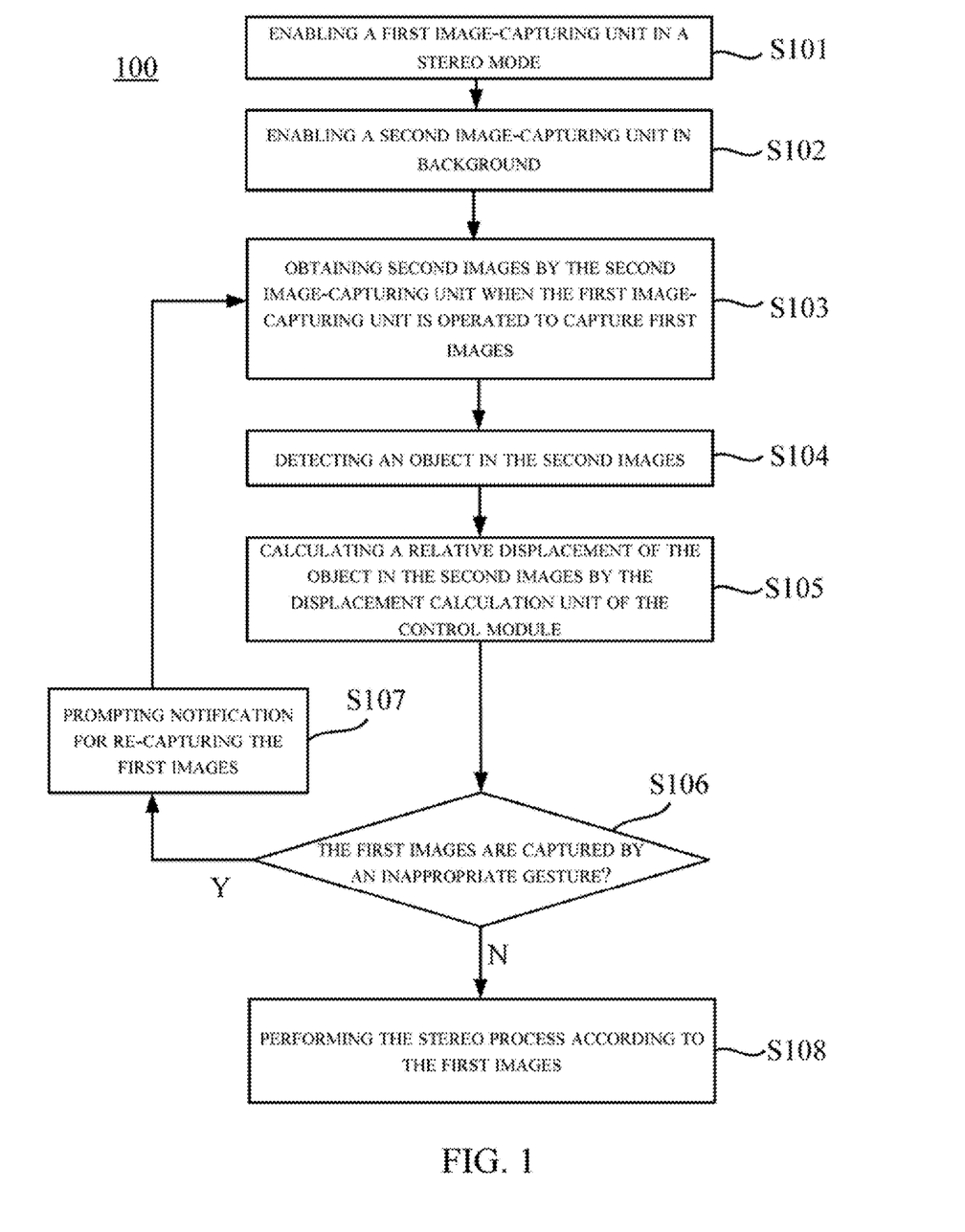
FIG. 1 is flow charts illustrating a controlling method according to an embodiment of this disclosure.

Reference is made to FIG. 1. FIG. 1 is flow charts illustrating a controlling method 100 according to an embodiment of this disclosure. The controlling method 100 is suitable for an electronic apparatus including two image-capturing units.

Figure 2A:
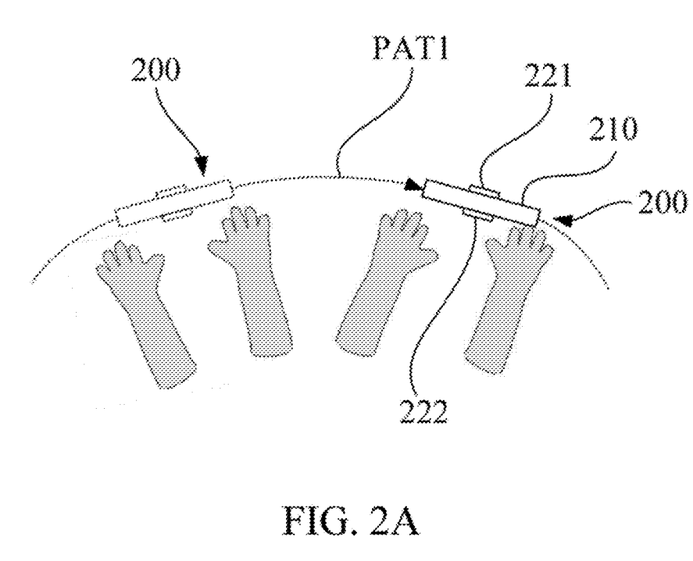
FIG. 2A and FIG. 2B are schematic diagrams illustrating an electronic apparatus is moved with different gestures according to an embodiment of the disclosure.
Figure 2B:
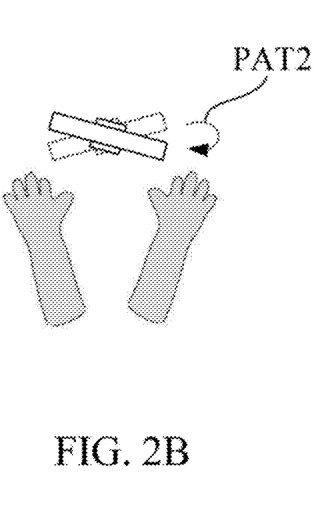
Figure 3:
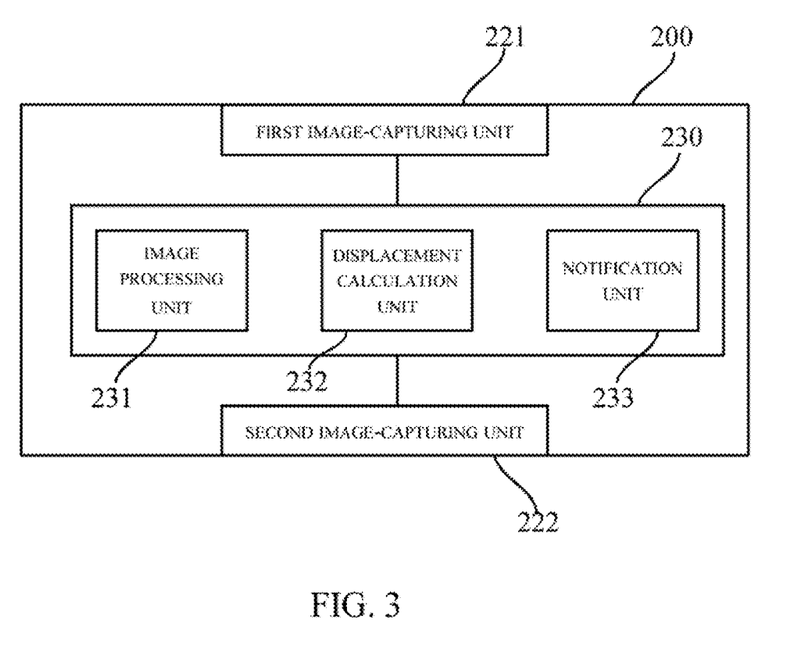
FIG. 3 is a function block diagram illustrating the electronic apparatus according to an embodiment of this disclosure.

FIG. 2A and FIG. 2B are schematic diagrams illustrating an electronic apparatus 200 is moved with different gestures according to an embodiment of the disclosure. As shown in FIG. 2A and FIG. 2B, the electronic apparatus 200 includes a casing 210, a first image-capturing unit 221 and a second image-capturing unit 222. The first image-capturing unit 221 and the second image-capturing unit 222 are implemented on opposite sides of the casing 210 of the electronic apparatus 200. FIG. 3 is a function block diagram illustrating the electronic apparatus 200 according to an embodiment of this disclosure. As shown in FIG. 3, the electronic apparatus 200 further include a control module 230 coupled with the first image capturing unit 221 and the second image capturing unit 222. In the embodiment, the control module 230 includes an image processing unit 231, a displacement calculation unit 232 and a notification unit 233. The image processing unit 231, the displacement calculation unit 232 and the notification unit 233 can be realized by a hardware circuit, a software program, a firmware or a combination thereof.

For example, some smart phones include two camera units at the same time. In general, one of them is used for photo-shooting in general, and the other is used for video-chatting (as a webcam), auxiliary shooting or other purposes. In the embodiment, the first image-capturing unit 221 can be a rear camera for photo-shooting in general, and the second image-capturing unit 222 can be a front camera. In some embodiments, the first image-capturing unit 221 and the second image-capturing unit 222 are both built-in cameras of the electronic apparatus 200. In other embodiments, the first image-capturing unit 221 and/or the second image-capturing unit 222 can a stand-alone camera which is attached onto the electronic apparatus 200.

In some embodiments, the electronic apparatus 200 can be a digital camera, a digital camcorder, a video camera, a phone with a built-in camera, a smart phone or any equivalent digital image capturing device.

As shown in FIG. 1, the controlling method 100 execute step S101 for enabling the first image-capturing unit 221 in a stereo mode for generating stereo information of a target.

To acquire stereo information of a target, the first image-capturing unit 221 can capture a series of first images related to the target in sequence. The first images can be utilized in a stereo process (e.g., depth computation, stereo content acquisition, establishing three-dimensional model). The first images must be captured from different positions (at different timing while the electronic apparatus 200 is moving) and the stereo process is based on disparity information between the first images.

According the basic pinhole camera model, images captured under a rotation gesture shown in FIG. 2A and another rotation gesture shown in FIG. 2B will show different geometry properties for stereo processing.

As shown in FIG. 2A, the first images are sequentially captured by the first image-capturing unit 221 along a first pattern PAT1, which is a circular trajectory as shown in FIG. 2A and a center of circular trajectory is located at where the user stand. When the user capture images with a proper gesture (e.g., holding the electronic apparatus 200 with their extended arms and rotating their body) and the electronic apparatus 200 will be moved along the first pattern PAT1 as shown in FIG. 2A, there will be an obvious shifting distance between different first images taken along the first pattern PAT1, such that objects of different depths will be captured in very different relational positions between two first images captured by the first image-capturing unit 221, thus leading to obvious disparity for depth computation.

Ideally, the user shall take consecutive images (two or more) along a circular trajectory with a fixed radius. The trajectory shall be approximately a partial circle centered at the user's body, as shown in FIG. 2A. In this way, the movement of the first image-capturing unit 221 matches the toe-out geometry model and preserves enough inter-camera distance. Therefore, high-quality 3D contents can be created by adopting this gesture.

On the other hand, when the user capture images with an inappropriate gesture (e.g., rotating the electronic apparatus 200 on their palms at a fixed position) and the electronic apparatus 200 will be rotated along the second pattern PAT2 as shown in FIG. 2B, photos sequentially captured by this gesture can not simulate an inter-camera distance between the photos (because the photos are captured when the first image-capturing unit 221 is fixed at the same spot), such that the photos captured in this gesture are not suitable for generating disparity information. Objects of different depths will be projected to almost same relational positions in two first images captured by the first image-capturing unit 221 by the inappropriate gesture when the electronic apparatus 200 is rotated along the second pattern PAT2. In other words, all objects will be determined at the same depth, such that the depth information generated from the first images captured by the gesture shown in FIG. 2B cannot be used for depth-aware applications.

Thus, in order to avoid inappropriate gesture, the controlling method 100 is utilized to detect whether the electronic apparatus 200 is operated with a proper image-capturing gesture (as shown in FIG. 2A) or an inappropriate image-capturing gesture (as shown in FIG. 2B) for notifying users of inappropriate image-capturing gesture occurring. When the first image-capturing unit 221 is enabled in the stereo mode (e.g., shooting multi-focus images, shooting stereoscopic images, shooting post-focus images or any 3D/3D-alike applications), the controlling method 100 executes step S102 for enabling the second image-capturing unit 222 in the background. In this embodiment, the second image-capturing unit 222 is used to capture images for detecting image-capturing gesture (auxiliary shooting).

When the first image-capturing unit 221 is operated to capture a plurality of first images for the stereo process, the controlling method 100 executes step S103 for obtaining a plurality of second images by the second image-capturing unit 222. For example, every times when the first image-capturing unit 221 is operated to capture one of the first images, the second image-capturing unit 222 is simultaneously triggered to capture one of the second images in the background. In the embodiment, the second images captured by the second image-capturing unit 222 (e.g., the front camera on the electronic apparatus 200) will provide important clues to identify the image-capturing gesture.

Figure 4A:
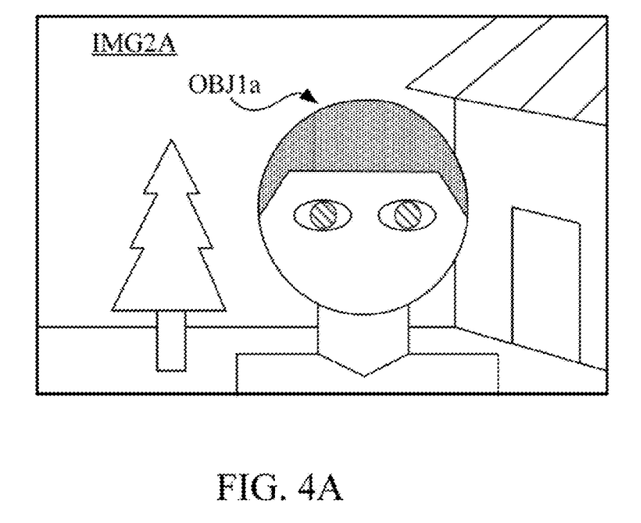
FIG. 4A is a schematic diagram illustrating the second image captured by the second image-capturing unit while the electronic apparatus is moving along the first pattern.
Figure 4B:
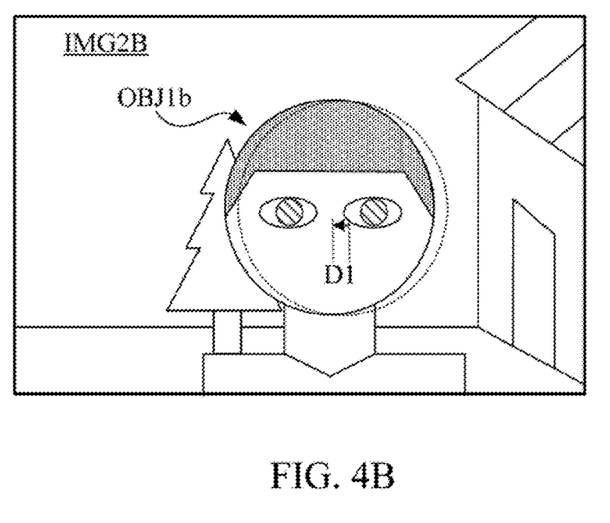
FIG. 4B is a schematic diagram illustrating the second image captured by the second image-capturing unit while the electronic apparatus is moving along the first pattern in the proper gesture.

Reference is made to FIG. 4A and FIG. 4B. FIG. 4A is a schematic diagram illustrating the second image IMG2A captured by the second image-capturing unit 222 while the electronic apparatus 200 are moving along the first pattern PAT1 (as shown in FIG. 2A). FIG. 4B is another schematic diagram illustrating the second image IMG2B captured by the second image-capturing unit 222 while the electronic apparatus 200 are moving along the first pattern PAT1 (as shown in FIG. 2A) in the proper gesture.

As shown in FIG. 4A and FIG. 4B, within the second images IMG2A/IMG2B captured by the second image-capturing unit 222 (e.g., the front camera) when user takes photos using the proper gesture, objects (e.g., a tree and a household) in the background of the second images IMG2A/IMG2B are obviously shifted (changed its angle) between two second images IMG2A/IMG2B. In the mean time, the face of user (who holds the electronic apparatus 200), i.e., a specific object at the foreground, remains at almost the same spot in the second images IMG2A/IMG2B (e.g., the object/face between the second images IMG2A/IMG2B are overlapped by 80% area or more).

Figure 5A:
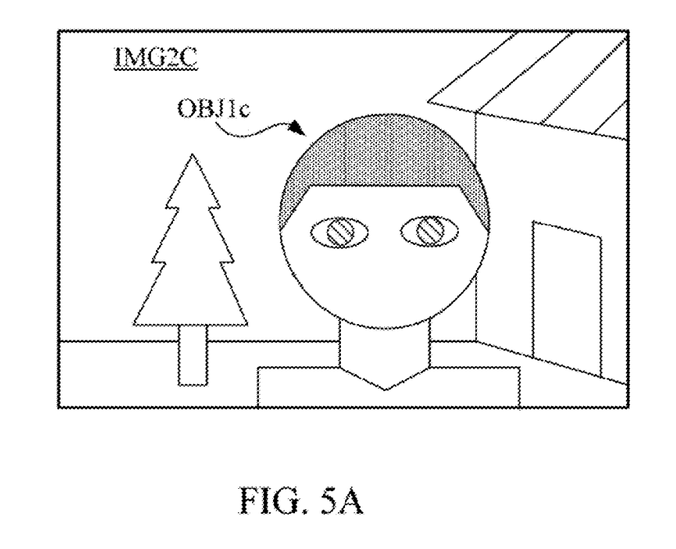
FIG. 5A is a schematic diagram illustrating the second image captured by the second image-capturing unit while the electronic apparatus is rotating along the second pattern.
Figure 5B:
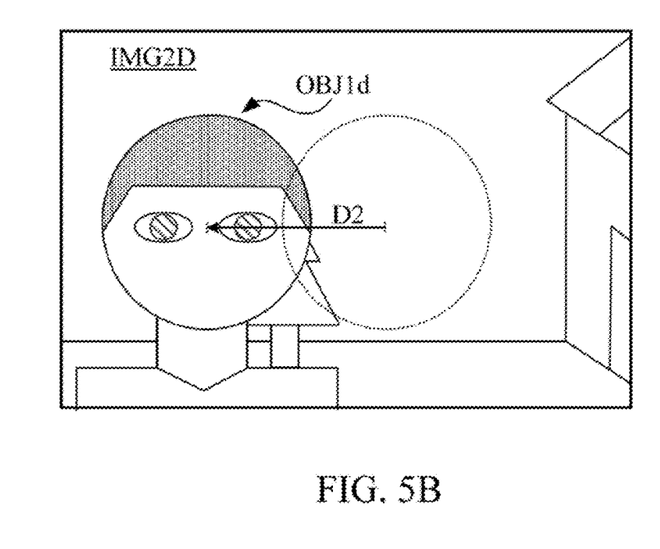
FIG. 5B is a schematic diagram illustrating the second image captured by the second image-capturing unit while the electronic apparatus is rotating along the second pattern on user's palms at a fixed position in the inappropriate gesture.

Reference is also made to FIG. 5A and FIG. 5B. FIG. 5A is a schematic diagram illustrating the second image IMG2C captured by the second image-capturing unit 222 while the electronic apparatus 200 is rotating along the second pattern PAT2 (as shown in FIG. 2B) by the inappropriate gesture. FIG. 5B is a schematic diagram illustrating the second image IMG2D captured by the second image-capturing unit 222 while the electronic apparatus 200 is rotating along the second pattern PAT2 (as shown in FIG. 2B) on user's palms at a fixed position by the inappropriate gesture.

As shown in FIG. 5A and FIG. 5B, within the second images IMG2C/IMG2D captured by the second image-capturing unit 222 (e.g., the front camera) when user takes photos using the inappropriate gesture, the face of user (who holds the electronic apparatus 200) moves significantly between two second images IMG2A/IMG2B (e.g., the object/face between the second images IMG2A/IMG2B are overlapped by 20% area or less, or not overlapped at all).

In aforesaid embodiments, two second images captured by the second image-capturing unit 222 are explained for demonstration. However, the disclosure is not limited to capture two first/second images during one stereo process. In other embodiments, two or more first/second images can be captured in sequence in order to perform the stereo process (e.g., depth computation or stereo content acquisition).

Therefore, the relationship between the images captured by the front camera can be utilized to determine whether the user hold and move the electronic apparatus 200 in proper gesture.

As shown in FIG. 1, after the second images are captured by the second image-capturing unit 222, the controlling method 100 executes step S104 for detecting at least an object within each of the second images. For example, the objects OBJ1a, OBJ1b, OBJ1c or OBJ1d within the second images IMG2A, IMG2B, IMG2C or IMG2D. In this embodiment, the object OBJ1a, OBJ1b, OBJ1c or OBJ1d comprises a human face (the face of the user who operates the electronic apparatus 200). The object OBJ1a, OBJ1b, OBJ1c or OBJ1d within each of the second images is detected with a facial recognition algorithm by the image processing unit 231 of the control module 230.

Afterward, the controlling method 100 executes step S105 for calculating a relative displacement of the object in the second images by the displacement calculation unit 232 of the control module 230.

In the example shown in FIG. 4A and FIG. 4B, when the user adopt the proper gesture, the relative displacement D1 between the same object OBJ1a/OBJ1b in the second images IMG2A and IMG2B is short (e.g., less than ⅕ width of the images). The relative displacement D1 can be calculated between centers of corresponding faces or facial features (e.g., noses, lips, etc) in the second images IMG2A and IMG2B. It is obvious that, when the user rotates his body to capture the first images for stereo-processing, the face of the photographer in both of the second images IMG2A and IMG2B will remains at almost the same position.

In the example shown in FIG. 5A and FIG. 5B, when the user adopt the inappropriate gesture, the relative displacement D2 between the same object OBJ1c/OBJ1d within the second images IMG2C and IMG2D is large (e.g., larger than ⅕ width of the images). It is obvious that, when the user simply rotates palms or fingers to capture the first images for stereo-processing, the location of the user's face in the second images IMG2C and IMG2D will shift significantly.

As shown in FIG. 1, the controlling method 100 executes step S106 for determining whether the first images are captured by an inappropriate gesture according to the relative displacement calculated from the second images. In some embodiments, whether the first images are captured by an inappropriate gesture or not are determined by comparing the relative displacement to a threshold value. The threshold value can be a predefined pixel number (e.g., 5, 10, 20 pixels), a predefined length or a predefined proportion (e.g., 5%, 10%, 15%) of the image width or any equivalent threshold reference.

In addition, the controlling method 100 is executed to selectively prompt a notification for re-capturing the first images according to the relative displacement when first images are captured by the inappropriate gesture.

When the relative displacement exceeds the threshold value (e.g., the relative displacement is D2 shown in the FIG. 5B), the first images are determined to be captured by the inappropriate gesture (e.g., the first image-capturing unit 221 is moved along the second pattern PAT2 as shown in FIG. 2B) in this case, and the controlling method 100 executes step S107 prompting the notification for re-capturing the first images. The notification can also remain user to change the image-capturing gesture into a proper one. The notification can be texts, icons or patterns displayed on a display panel (not illustrated in figures) of the electronic apparatus 200. In another embodiment, the notification can be voice prompts broadcasted by a speaker (not illustrated in figures) of the electronic apparatus 200.

In the embodiment, holding and moving the first image-capturing unit 221 along the second pattern PAT2 is regarded as the inappropriate gesture, because this gesture (referring to FIG. 2B) fails to form a valid shifting distance while the first image-capturing unit 221 is rotating at the fixed spot. However, the inappropriate gesture disclosed in the disclosure is not limited to FIG. 2B. The inappropriate gesture includes any equivalent gesture which fails to from any shifting distance while the first image-capturing unit 221 is moving.

When the relative displacement is less than the threshold value (e.g., the relative displacement is D1 shown in the FIG. 4B), the first images are determined to be captured by the proper gesture (e.g., the first image-capturing unit 221 is moved along the first pattern PAT1 as shown in FIG. 2A) in this case, and the controlling method 100 executes step S108 for performing the stereo process according to the first images.

In the embodiment, holding and moving the first image-capturing unit 221 along the first pattern PAT1 is regarded as the proper gesture, because this gesture (referring to FIG. 2A) is able to form a specific shifting distance while the first image-capturing unit 221 is moving. However, the proper gesture disclosed in the disclosure is not limited to FIG. 2A. The proper gesture includes any equivalent gesture which is able to from the shifting distance while the first image-capturing unit 221 is moving.

By calculating the facial features or center of the largest face in the view of the second image-capturing unit 222 (e.g., the front camera), the controlling method 100 and the electronic apparatus 200 can easily identify whether the image-capturing gesture is proper. Accordingly, the controlling method 100 and the electronic apparatus 200 can inform the user to re-capture the first images to optimize the stereo-processing preciseness.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A controlling method, suitable for a first image-capturing unit and a second image-capturing unit, the controlling method comprising:
    obtaining a plurality of second images by the second image-capturing unit when the first image-capturing unit is operated to capture a plurality of first images for a stereo process;
    detecting an object in the second images:
    calculating a relative displacement of the object in the second images; and
    determining whether the first images are captured by an inappropriate gesture according to the relative displacement calculated from the second images.

2. The controlling method of claim 1, wherein the first images and the second images are captured along opposite orientations respectively by the first image-capturing unit and the second image-capturing unit.

3. The controlling method of claim 1, wherein the first image-capturing unit and the second image-capturing unit are disposed on an electronic apparatus, the first images are captured sequentially by the first image-capturing unit while the electronic apparatus are moving along a pattern, and the first images are utilized for depth computation or stereo content acquisition in the stereo process.

4. The controlling method of claim 3, wherein the first images are captured from different positions and the stereo process is based on disparity information between the first images.

5. The controlling method of claim 3, wherein the first image-capturing unit and the second image-capturing unit are implemented on opposite sides of the electronic apparatus, the first image-capturing unit is a rear camera and the second image-capturing unit is a front camera.

6. The controlling method of claim 5, wherein the first image-capturing unit and the second image-capturing unit are built-in cameras of the electronic apparatus.

7. The controlling method of claim 5, wherein the first image-capturing unit or the second image-capturing unit is a stand-alone camera attached onto the electronic apparatus.

8. The controlling method of claim 1, wherein the step of determining whether the first images are captured by the inappropriate gesture comprises:
    comparing the relative displacement of the object in the second images to a threshold value, the first images are determined to be captured by the inappropriate gesture when the relative displacement exceeds the threshold value, the first images are determined to be captured by a proper gesture when the relative displacement is below the threshold value.

9. The controlling method of claim 8, further comprising:
    prompting a notification for re-capturing the first images when the relative displacement exceeds the threshold value.

10. The controlling method of claim 9, further comprising:
    performing the stereo process according to the first images when the relative displacement is less than the threshold value.

11. The controlling method of claim 1, wherein the object comprises a human face and the object within each of the second images is detected by a facial recognition algorithm.

12. The controlling method of claim 1, wherein, when the first images are captured by the inappropriate gesture, the first image-capturing unit is substantially located at a fixed spot without a shifting distance while capturing the first images.

13. An electronic apparatus, comprising:
    a casing;
    a first image capturing unit, disposed on a first side of the casing;
    a second image capturing unit, disposed on a second side of the casing opposite to the first side; and
    a control module, coupled with the first image capturing unit and the second image capturing unit, the second image-capturing unit is enabled by the control module to capture a plurality of second images when the first image-capturing unit is operated to capture a plurality of first images for a stereo process, wherein the second images are utilized to determining whether the first images are captured by an inappropriate gesture.

14. The electronic apparatus of claim 13, wherein the first image-capturing unit is a rear camera and the second image-capturing unit is a front camera.

15. The electronic apparatus of claim 13, wherein the control module comprises:
    an image processing unit configured for detecting an object in the second images;
    a displacement calculation unit configured for calculating a relative displacement of the object in the second images, the relative displacement is utilized to determine whether the first images are captured by the inappropriate gesture; and
    a notification unit configured for selectively prompting a notification for re-capturing the first images according to the relative displacement.

* * * * *